United States Patent
Shoemaker

[15] 3,659,925
[45] May 2, 1972

[54] THREE COMPONENT 2.5X MICROSCOPE OBJECTIVE

[72] Inventor: Arthur H. Shoemaker, Erie, N.Y.
[73] Assignee: American Optical Corporation, Southbridge, Mass.
[22] Filed: Mar. 24, 1971
[21] Appl. No.: 127,571

[52] U.S. Cl. .................................350/225, 350/175 ML
[51] Int. Cl. .........................................G02b 21/02
[58] Field of Search ........................350/225, 175 ML

[56] References Cited

UNITED STATES PATENTS 2,713,808  7/1955  Klein..................350/175 ML UX
3,262,363  7/1966  Ziegler.........................350/225

Primary Examiner—John K. Corbin
Attorney—William C. Nealon, Noble S. Williams, Robert J. Bird and Bernard L. Sweeney

[57] ABSTRACT

A three component achromatic microscope objective having a magnification of 2.5X and a numerical aperture of 0.07.

2 Claims, 1 Drawing Figure

Patented May 2, 1972
3,659,925
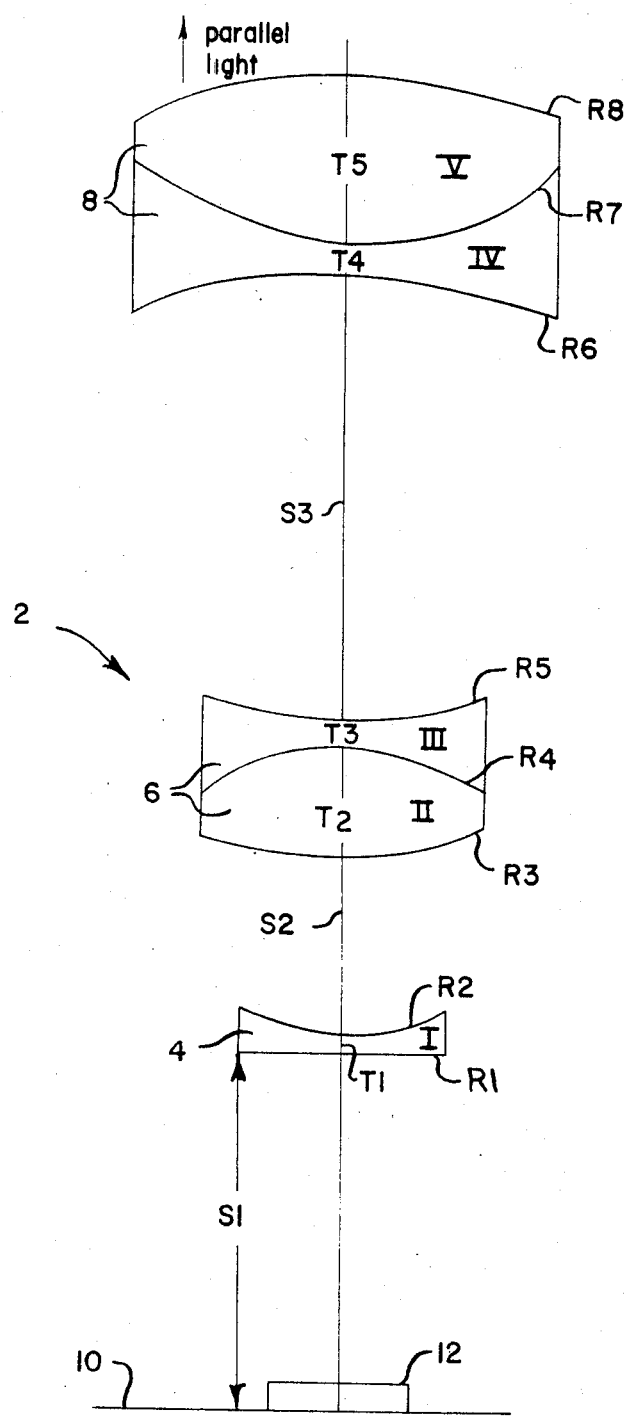
INVENTOR.
ARTHUR H. SHOEMAKER
BY Robert J. Bird
ATTORNEY

THREE COMPONENT 2.5X MICROSCOPE OBJECTIVE

BACKGROUND OF THE INVENTION

This invention relates to improvements in a microscope objective, and in particular to an achromatic microscope objective with a magnification of substantially 2.5X and a numerical aperture of substantially 0.07. It is the object of the present invention to provide such a microscope objective which is well corrected for the usual chromatic image aberrations as well as spherical aberration, coma, and astigmatism, while having a substantially flat image field when used with a telescope objective as described in U. S. Pat. No. 3,355,234, issued to Robert M. Muller.

jective are listed in the following table in which ND is the refractive index for the D line of sodium, $\gamma$ is the Abbe number. Radii (R), thicknesses (T), and spacings (S) are expressed in millimeters and a negative sign indicates radii on centers of curvature lying on the object side of their vertices.

MAGNIFICATION=2.5X N.A.=0.07

| Lens | Radius R | Thickness | Space S | Refractive Index ND | Abbe Number $\nu$ |
|---|---|---|---|---|---|
| I | $R_1$=Plano | $T_1$=.02055F | $S_1$=.12989F | ND1=1.69669 | $\nu_1$=56.13 |
|   | $R_2$=.08442F |   |   |   |   |
| II | $R_3$=.26868F | $T_2$=.03187F | $S_2$=.08002F | ND2=1.71715 | $\nu_2$=29.51 |
|   | $R_4$=−.06636F |   |   |   |   |
| III |   | $T_3$=.01493F |   | ND3=1.64316 | $\nu_3$=47.92 |
|   | $R_5$=.13545F |   |   |   |   |
| IV | $R_6$=−1.37232F | $T_4$=.02055F | $S_3$=.19826F | ND4=1.74054 | $\nu_4$=27.59 |
|   | $R_7$=.21237F |   |   |   |   |
| V |   | $T_5$=.04745F |   | ND5=1.69669 | $\nu_5$=56.13 |
|   | $R_8$=−.21237F |   |   |   |   |

The foregoing parameters of radius, thickness, and spacing are functions of the equivalent focal length F of the objective. The value of F, as an example, is 72.986 millimeters. At this focal length, the absolute values of the foregoing data are as follows:

F=72.986 MAGNIFICATION=2.5X N.A.=0.07

| Lens | Radius R | Thickness T | Space S | Refractive Index ND | Abbe Number $\nu$ |
|---|---|---|---|---|---|
| I | $R_1$=Plano | $T_1$=1.500 | $S_1$=9.480 | ND1=1.69669 | $\nu_1$=56.13 |
|   | $R_2$=6.1617 |   |   |   |   |
| II | $R_3$=19.610 | $T_2$=2.326 | $S_2$=5.84 | ND2=1.71715 | $\nu_2$=29.51 |
|   | $R_4$=−4.843 |   |   |   |   |
| III |   | $T_3$=1.090 |   | ND3=1.64316 | $\nu_3$=47.92 |
|   | $R_5$=9.886 |   |   |   |   |
| IV | $R_6$=−100.160 | $T_4$=1.500 | $S_3$=14.470 | ND4=1.74054 | $\nu_4$=27.59 |
|   | $R_7$=15.500 |   |   |   |   |
| V |   | $T_5$=3.463 |   | ND5=1.69669 | $\nu_5$=56.13 |
|   | $R_8$=−15.500 |   |   |   |   |

DRAWING

The drawing is an optical diagram of a microscope objective of the present invention.

DESCRIPTION

Referring now to the drawing, a microscope objective is shown generally at 2. It includes the following components: A front single lens 4, a doublet 6, and a doublet 8, all of said components being optically aligned. Objective 2 is shown disposed relative to an object plane 10 supporting a specimen or object 12. Lens 4 is a plano-concave lens, also designated I. Doublet 6 includes a double convex lens element II and a double concave lens element III, together forming a convex-concave doublet. Doublet 8 includes a double concave lens element IV and a double convex lens element V, together forming a concavo-convex doublet.

The parameters of the lens elements which make up the objective are listed in the following table in which ND is the refractive index for the D line of sodium, $\gamma$ is the Abbe number.

What is claimed is:

1. An achromatic microscope objective having a magnification of substantially 2.5X and a numerical aperture of substantially 0.07 for forming an image of an object plane, said image being well corrected for chromatic and spherical aberrations, coma, astigmatism, and curvature of image field, said objective comprising the following components:
   a front plano-concave lens I;
   a second double convex lens element II;
   a third double concave lens element III;
   said second and third elements forming a doublet;
   a fourth double concave lens element IV;
   a fifth double convex lens element V;
   said fourth and fifth elements forming a doublet;
   all of said components being optically aligned;
   the parameters of lens radii (R), thicknesses (T), spacings (S), refractive indices (ND), and Abbe numbers ($\gamma$), being determined by the following relationship wherein radii, thicknesses, and spacings are expressed in millimeters:

MAGNIFICATION=2.5X N.A.=0.07

| Lens | Radius R | Thickness T | Space S | Refractive Index ND | Abbe Number $\nu$ |
|---|---|---|---|---|---|
| I | $R_1$=Plano<br>$R_2$=.08442F | $T_1$=.02055F | $S_1$=.12989F<br>$S_2$=.08002F | ND1=1.69669 | $\nu_1$=56.13 |
| II | $R_3$=.26868F<br>$R_4$=−.06636F | $T_2$=.03187F | | ND2=1.71715 | $\nu_2$=29.51 |
| III | $R_5$=.13545F | $T_3$=.01493F | $S_3$=.19826F | ND3=1.64316 | $\nu_3$=47.92 |
| IV | $R_6$=−1.37232F<br>$R_7$=.21237F | $T_4$=.02055F | | ND4=1.74054 | $\nu_4$=27.59 |
| V | $R_8$=−.21237F | $T_5$=.04745F | | ND5=1.69669 | $\nu_5$=56.13 |

2. An achromatic microscope objective having a magnification of substantially 2.5X and a numerical aperture of substantially 0.07 for forming an image of an object plane, said image being well corrected for chromatic and spherical aberrations, coma, astigmatism, and curvature of image field, said objective comprising the following components:
   a front plano-concave lens I;
   a second double convex lens element II;
   a third double concave lens element III;
   said second and third elements forming a doublet;
   a fourth double concave lens element IV;
   a fifth double convex lens element V;
   said fourth and fifth elements forming a doublet;
   all of said components being optically aligned;
   the parameters of lens radii (R), thicknesses (T), spacings (S), refractive indices (ND), and Abbe numbers ($\gamma$), being determined by the following relationship wherein radii, thicknesses, and spacings are expressed in millimeters:

F=72.986 MAGNIFICATION=2.5X N.A.=0.07

| Lens | Radius R | Thickness T | Space S | Refractive Index ND | Abbe Number $\nu$ |
|---|---|---|---|---|---|
| I | $R_1$=Plano<br>$R_2$=6.1617 | $T_1$=1.500 | $S_1$=9.480<br>$S_2$=5.84 | ND1=1.69669 | $\nu_1$=56.13 |
| II | $R_3$=19.610<br>$R_4$=−4.843 | $T_2$=2.326 | | ND2=1.71715 | $\nu_2$=29.51 |
| III | $R_5$=9.886 | $T_3$=1.090 | $S_3$=14.470 | ND3=1.64316 | $\nu_3$=47.92 |
| IV | $R_6$=−100.160<br>$R_7$=15.500 | $T_4$=1.500 | | ND4=1.74054 | $\nu_4$=27.59 |
| V | $R_8$=−15.500 | $T_5$=3.463 | | ND5=1.69669 | $\nu_5$=56.13 |

* * * * *